United States Patent Office 3,183,244
Patented May 11, 1965

3,183,244
SOLID REACTION PRODUCTS OF AMIDES
AND BORANES
Marvin M. Fein, Westfield, N.J., assignor, by mesne assignments, to Thiokol Chemical Corporation, a corporation of Delaware
No Drawing. Filed May 22, 1957, Ser. No. 660,987
14 Claims. (Cl. 260—326.3)

This invention relates to solid reaction products of amides and boranes.

The solid products of this invention when incorporated with suitable oxidizers such as ammonium perchlorate, potassium perchlorate, sodium perchlorate, etc., yield solid propellants generally suitable for rocket power plants and other jet propelled devices. Such propellants burn with high flame speeds, have high heats of combustion, and are of the high specific impulse type. One of the most important single factors in determining the performance of a propellant charge is the specific impulse. Appreciable increases in performance of course will result from the use of higher specific impulse materials. The products of this invention when incorporated with oxidizers are capable of being formed into a wide variety of grains, tablets and shapes, with all the desirable chemical and mechanical characteristics. Propellants made by the methods of this invention, will burn uniformly without disintegration when ignited by conventional means, such as pyrotechnic type igniters. They are also mechanically strong enough to withstand ordinary handling.

The solid reaction products of this invention are prepared by reacting a borane with 2-pyrrolidone or an amide of the formula

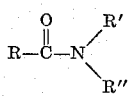

in which R is a radical selected from the group consisting of hydrogen, lower alkyl and lower alkenyl radicals, and R' and R" are radicals selected from the group consisting of hydrogen and lower alkyl radicals.

Suitable boranes include tetraborane, pentaborane, decaborane, lower alkyl pentaboranes in which the alkyl groups contain 2 to 4 carbon atoms and lower alkyl decaboranes in which the alkyl groups contain 2 to 4 carbon atoms. Lower alkyl pentaboranes can be prepared, for example, according to the method described in application Serial No. 546,803, filed November 14, 1955, of Jack R. Gould and John E. Paustian, now abandoned. Lower alkyl decaboranes can be prepared, for example, according to the method described in application Serial No. 557,634, filed January 6, 1956, to Joseph A. Neff and Edward J. Wandel, now patent No. 2,987,552.

Suitable amides include, for example, formamide, acetamide, acrylamide, dimethyl acetamide, N-ethylacetamide, propionamide, butyramide, valeramide, and isovaleramide. The amides can be monomeric or polymeric.

The ratio of reactants can be varied widely, generally being in the range from 0.1 to 10 moles of amide per mole or borane, preferably .5 to 2:1. The reaction temperature can vary from 0° to 170° C. and the pressure can vary from 0.002 mm. of mercury to several atmospheres, although subatmospheric pressures are preferred. The reaction is a substitution reaction and the degree of completeness of the reaction can be determined by the rate and quantity of hydrogen evolution. Also the rate at which solid products form and precipitate from the solution indicates the degree of completion of the reaction. The reaction to go to completion generally requires about 2 to 30 hours, depending upon the ratio of reactants, the particular amide utilized, and the temperature and pressure employed.

Although the reaction will proceed in the absence of a solvent, best results are obtained, especially where solid reactants are employed, by carrying out the reaction in a solvent common for the reactants but inert with respect to the reactants. Such solvents include aliphatic hydrocarbon solvents such as n-pentane, hexane and heptane, aromatic hydrocarbon solvents such as benzene, toluene and xylene, cycloaliphatic solvents such as cyclohexane and methylcyclopentane and oxygenated organic solvents such as tetrahydrofuran, ethyl acetate, and diisopropylether. The amount of solvent can vary widely but is generally within the range of about 1 to 100 moles per mole of each reactant. When a solvent is employed, it is preferred to carry out the reaction at the reflux temperature of the solvent.

The process of the invention is illustrated in detail by the following examples which are to be considered not limitative.

Example I 12.2 g. (0.1 mole) of decaborane dissolved in 600 ml. of dry benzene was placed in a 1000 ml. three-necked flask equipped with a magnetic stirrer, thermometer, dropping funnel with a bypass and reflux condenser having a tube leading to a wet test meter which monitored gas evolution. 8.7 g. (0.1 mole) of dimethylacetamide in 120 ml. of dry benzene was added dropwise at room temperature. The reaction mixture was then stirred and heated to 50°– 52° C. for five hours, during which time a gas, later analyzed as hydrogen, evolved. At the end of the reaction it was observed that a white solid had formed in the flask. This was filtered, washed with dry benzene to yield 8.1 g. of dry product which melted at 137° to 138° C. Analysis indicated a compound having the generic formula

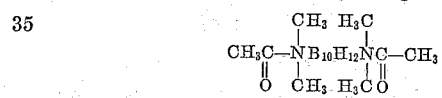

(2:1 mole ratio of dimethylacetamide to one mole of decaborane).

|  | Calculated, percent | Found, percent |
|---|---|---|
| Nitrogen | 9.52 | 9.91 |
| Boron | 36.73 | 35.43 |

Example II

A three-necked flask was equipped with a magnetic stirrer, thermometer, dropping funnel with a bypass and a reflux condenser with a drying tube leading to a wet test meter which monitored the gas evolution. 12.2 g. (0.1 mole) of decaborane-14 and 75 ml. of benzene were poured into the flask. As the mixture was stirred, a slurry of 5.9 g. (0.1 mole) of acetamide in 50 ml. of benzene was added over a period of 15 minutes. While heating at reflux for 4½ hours, an orange oil formed after 20 minutes which solidified about 2 hours later as the reaction proceeded. Gas evolution of 2.50 liters (0.1 mole when corrected to standard conditions), was monitored. The gas was transparent to infrared, and was determined to be hydrogen. The benzene was decanted from the resinous solid and concentrated in vacuo to yield 6.4 g. (0.05 mole) crude decaborane-14. The resinous solid was washed with benzene and dried in vacuo yielding 11.0 g. of an infusible orange solid. This solid was submitted for infrared analysis and absorptions consistent with an acetamide-decaborane reaction product having the formula

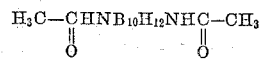

was indicated.

Example III

A 500 ml. three-necked flask was equipped with a magnetic stirrer, thermometer, dropping funnel with a bypass and reflux condenser having a drying tube leading to a wet test meter which monitored the gas evolution. To the flask was added 0.1 mole of decaborane and 75 ml. of benzene. As the mixture was stirred with a magnetic stirrer a slurry of 0.1 mole of formamide dissolved in 50 ml. of benzene was slowly added. This reaction mixture was heated at reflux for about 4½ hours at a temperature of approximately 78° C. A light cream colored powder formed in the reaction flask. This was separated by filtration, washed with benzene and found to weigh 7.9 g. Infrared analysis of this powder indicated a formamide-decaborane reaction product having the formula

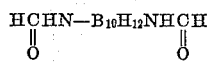

Example IV

A benzene solution (50 ml.) containing 7.1 g. (0.1 mole) of acrylamide was added to 12.2 g. (0.1 mole) of decaborane dissolved in 75 ml. of dry benzene at room temperature. These reactants were combined in a 500 ml. three-necked glass flask which was equipped with a magnetic stirrer, thermometer, dropping funnel with a bypass and reflux condenser having a drying tube leading to a wet test meter which monitored gas evolution. The reaction mixture was slowly heated to 70° C. (over a 4 hour period) and maintained at this temperature for two hours. A gas later analyzed as hydrogen evolved and was found to be 76 percent of theoretical. At the end of this reaction it was observed that an orange red solid had formed in the reaction flask. This was separated by filtration, washed with benzene, and upon drying found to weigh 12 g. Infrared analysis indicated an acrylamide-decaborane reaction product having two molecules of acrylamide to one molecule of decaborane.

Example V

A solution of 12.2 g. decaborane (0.1 mole) in 75 ml. of benzene was added to 8.5 g. of 2-pyrrolidone in 75 ml. of benzene over a period of one hour. This mixture was stirred for 18 hours at 27–31° C. During this time the solution color changed from light yellow to yellow to orange-yellow, a white solid precipitated, and 0.05 M of gas was evolved. The white solid was isolated, washed with benzene and dried, weight 15.0 g. Infrared spectrophotometric analysis revealed B—H, N—H, C=O and CH bonds and also a disubstituted decaborane nucleus.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning charatceristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by extrusion. Thereafter the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

I claim:

1. A process for the preparation of solid reaction products of amides and boranes which comprises reacting an amide selected from the group consisting of 2-pyrrolidone and an amide of the formula

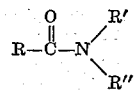

in which R is a radical selected from the group consisting of hydrogen, lower alkyl and lower alkenyl radicals, and R' and R" are radicals selected from the group consisting of hydrogen, methyl and ethyl radicals, with a borane selected from the group consisting of tetraborane, pentaboranes, decaborane, lower alkyl pentaboranes and lower alkyl decaboranes, the amide and borane being reacted in the molar ratio of 0.1 to 10:1 respectively.

2. A process for the preparation of solid reaction products of amides and boranes which comprises reacting from 0.1 to 10 moles of the amide per mole of the borane at a temperature of 0° to 170° C. in the presence of a solvent inert with respect to the reactants, the amide being selected from the group consisting of 2-pyrrolidone and an amide of the formula

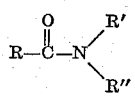

in which R is a radical selected from the group consisting of hydrogen, lower alkyl and lower alkenyl radicals, and R' and R" are radicals selected from the group consisting of hydrogen, methyl and ethyl radicals, and the borane being a borane selected from the group consisting of tetraborane, pentaboranes, decaborane, lower alkyl pentaboranes, and lower alkyl decaboranes.

3. A process for the preparation of solid reaction products of amides and decaborane which comprises reacting from 0.5 to 2 moles of the amide per mole of decaborane for from about 2 to 30 hours in the presence of benzene at a temperature of about 20°–85° C., the amide being selected from the group consisting of 2-pyrrolidone and an amide of the formula

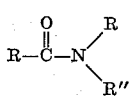

in which R is a radical selected from the group consisting of hydrogen, lower alkyl and lower alkenyl radicals, and R' and R" are radicals selected from the group consisting of hydrogen, methyl and ethyl radicals.

4. The process of claim 3 in which the amide is acetamide.

5. The process of claim in which the amide is dimethyl acetamide.

6. The process of claim 3 in which the amide is formamide.

7. The process of claim 3 in which the amide is acrylamide.

8. The process of claim 3 in which the amide is 2-pyrrolidone.

9. The product produced by the process of claim 2.

10. The product produced by the process of claim 4.

11. The product produced by the process of claim 5.

12. The product produced by the process of claim 6.

13. The product produced by the process of claim 7.

14. The product produced by the process of claim 8.

No references cited.

IRVING MARCUS, *Primary Examiner.*

L. D. ROSDOL, *Examiner.*